United States Patent
Choi

(10) Patent No.: US 7,859,731 B2
(45) Date of Patent: Dec. 28, 2010

(54) ILLUMINATION APPARATUS FOR DISPLAY DEVICE USING HOLOGRAM-BASED LIGHT GUIDE PLATE (LGP)

(75) Inventor: Jin-Seung Choi, Suwon-si (KR)

(73) Assignee: Sumsung Electronics Co., Ltd., Suwon-si (KR)

(*) Notice: Subject to any disclaimer, the term of this patent is extended or adjusted under 35 U.S.C. 154(b) by 201 days.

(21) Appl. No.: 11/302,380

(22) Filed: Dec. 14, 2005

(65) Prior Publication Data

US 2006/0126142 A1 Jun. 15, 2006

(30) Foreign Application Priority Data

Dec. 14, 2004 (KR) .................. 10-2004-0105649

(51) Int. Cl.
*G03H 1/00* (2006.01)
*F21V 7/04* (2006.01)
(52) U.S. Cl. .................. 359/34; 359/15; 362/600; 362/621; 385/146; 385/147
(58) Field of Classification Search .................. 362/31, 362/32, 621, 26, 27, 600; 385/146, 147; 359/34, 15
See application file for complete search history.

(56) References Cited

U.S. PATENT DOCUMENTS

| | | | | |
|---|---|---|---|---|
| 5,359,691 A * | 10/1994 | Tai et al. | ...................... | 385/146 |
| 5,669,693 A * | 9/1997 | Smith | ..................... | 362/511 |
| 6,480,307 B1 * | 11/2002 | Yang | ......................... | 359/15 |
| 6,733,147 B2 * | 5/2004 | Wang et al. | .................. | 362/26 |
| 7,220,043 B2 * | 5/2007 | Cha et al. | .................. | 362/621 |
| 2004/0141104 A1 * | 7/2004 | Yu et al. | ...................... | 349/65 |

FOREIGN PATENT DOCUMENTS

KR 2003-0038294 A 5/2003

* cited by examiner

*Primary Examiner*—Audrey Y Chang
(74) *Attorney, Agent, or Firm*—Sughrue Mion, PLLC

(57) ABSTRACT

An illumination apparatus and method for a display device designed such that light is incident on a hologram or hologram pattern at an angle for which diffraction efficiency is the highest. The illumination apparatus includes at least one point light source which emits light and a light guide plate (LGP) which has the at least one point light source disposed on a side thereof and a hologram pattern on a top surface which permits the light incident from the point light source to exit from the top surface. The side of the LGP facing the point light source is inclined such that the light is incident obliquely on the hologram pattern at an altitude angle which provides high diffraction efficiency.

4 Claims, 4 Drawing Sheets

α : ALTITUDE ANGLE
δ : AZIMUTH ANGLE

US 7,859,731 B2

ILLUMINATION APPARATUS FOR DISPLAY DEVICE USING HOLOGRAM-BASED LIGHT GUIDE PLATE (LGP)

CROSS-REFERENCE TO RELATED PATENT APPLICATION

This application claims priority from Korean Patent Application No. 10-2004-0105649, filed on Dec. 14, 2004, in the Korean Intellectual Property Office, the disclosure of which is incorporated herein in its entirety by reference.

BACKGROUND OF THE INVENTION

1. Field of the Invention

Apparatuses and methods consistent with the present invention relate to an illumination apparatus and method for a display device, and more particularly, to an illumination apparatus and method for a display device constructed such that an incident ray impinges upon a hologram or hologram micro-pattern at an angle which provides high diffraction efficiency.

2. Description of the Related Art

Non-emissive displays such as liquid crystal displays (LCDs) typically require a separate light source such as an LCD backlight. The LCD backlight needs to provide a uniform illumination.

FIG. 1 schematically shows a conventional LCD backlight using a point light source. Referring to FIG. 1, a plurality of light emitting diodes (LEDs) 41 are arranged in parallel along one side of a light guide plate (LGP) 43. Light rays emitted by the plurality of LEDs 41 are incident on a microscopic hologram pattern 45 formed on the top surface of the LGP 43 as they propagate in the LGP 43. The light rays incident on the hologram pattern 43 are diffracted by the hologram pattern 45, are emitted vertically through the top surface of the LGP 43, and are incident on an LCD panel (not shown).

The hologram pattern 45 causes incident light to emit onto the LCD panel and is oriented in a predetermined direction. When light is incident upon the hologram pattern 45 from a specific azimuth angle and altitude angle, the incident light can be diffracted and exit with highest efficiency. FIG. 2 is a diagram for explaining the azimuth angle and altitude angle of a ray incident on the hologram pattern 45. As shown in FIG. 2, the azimuth angle is an angle of an incident ray with respect to an axis perpendicular to a direction of the hologram pattern 45, and the altitude angle is an angle of an incident ray with respect to an axis perpendicular to a surface of the hologram pattern 45. To achieve highest diffraction efficiency, the azimuth angle is 0° (i.e., incident beam is normal to the holographic diffraction pattern 45) and the altitude angle is usually near 50° as shown in FIG. 3.

Since the LED 41 has a radiation angle of about 45°, there are dead zones on which light is not incident at a portion of the hologram pattern 45 closest to a space between the LEDs 41. On the other hand, incident rays emitted by the LED 41 overlap each other so the intensity of light increases at a portion of the hologram pattern 45 that is distant from the LEDs 41. Here, a light radiation angle refers to an angle at which light intensity becomes half the maximum light intensity. FIG. 4 is a graph of light intensity vs. LED radiation angle. Referring to FIG. 4, as the radiation angle increases, the light intensity decreases. The light intensity decreases by half when the radiation angle is 45°. Thus, an angle at which light radiated from the plurality of LEDs 41 is incident on the hologram pattern 45 varies depending on the location of the hologram pattern 45. Consequently, an emission angle and light intensity vary across the hologram pattern 45.

Referring to FIG. 1, to solve this problem, the conventional LCD backlight includes an element for collimating an incident ray at an incident portion of the LGP 43. However, the conventional LCD backlight provides low diffraction efficiency because a highest-intensity incident ray is incident on the hologram pattern 45 at an altitude angle of 90°. That is, the highest-intensity ray is a ray radiated from the center of a LED (see FIG. 4), which propagates parallel to the LGP 43 within the LGP 43. Thus, as evident from FIG. 3, the highest-intensity ray is incident on the hologram pattern 45 at 90° for which diffraction efficiency is approximately 0. Conversely, only a ray with light intensity that is half the maximum intensity is diffracted from the hologram pattern 45 with the highest efficiency. As a result, since only 80% of the rays incident to the LGP 43 exits from the top surface of the LGP 43, the efficiency of light utilization is low.

SUMMARY OF THE INVENTION

The present invention provides an illumination apparatus for a display device using a hologram-based LGP constructed to improve light utilization efficiency by permitting a ray emitted from a point light source to be incident on a hologram pattern at an altitude angle for which diffraction efficiency is the highest.

According to an aspect of the present invention, there is provided an illumination apparatus for a display device including: at least one point light source that emits light; and an LGP comprising a hologram pattern on a top surface, wherein the side of the LGP facing the point light source is configured such that the light is incident obliquely on the hologram pattern. The light may be configured to be incident on the hologram pattern with an altitude angle which provides the highest diffraction efficiency.

The side of the LGP facing the point light source may be inclined and the point light source may be disposed obliquely so as to be parallel to the inclined side of the LGP.

The illumination apparatus may further include: a hologram pattern that is formed on a bottom surface of the LGP, wherein the top surface of the LGP reflects a remaining portion of the incident light; and a portion of the remaining portion of the incident light exits from the bottom surface. It may also include a reflector which reflects the portion of the remaining portion of the incident light exiting out of the bottom surface of the LGP onto the top surface of the LGP. It may further include a collimator which collimates the light emitted from the point light source into a substantially parallel beam so that the light is incident on the hologram pattern at an azimuth angle for which diffraction efficiency is the highest.

According to another aspect of the present invention, there is provided an illumination apparatus for a display device including: at least one point light source that emits light; an LGP which has the at least one point light source disposed on a side thereof and a hologram pattern on a top surface, which permits a portion of the light incident from the point light source to exit from the top surface; and a refracting element which refracts the light emitted from the point light source so that the light is incident obliquely on the hologram pattern at an altitude angle for which diffraction efficiency is the highest.

The illumination apparatus may further include: a hologram pattern that is formed on a bottom surface of the LGP and permits a portion of the incident light refracted toward the bottom surface of the LGP to exit from the bottom surface thereof; and a reflector which reflects the portion of the incident light exiting out of the bottom surface of the LGP onto the top surface of the LGP.

The refracting element may include: a first inclined surface formed on the side of the LGP facing the point light source in such a way that a portion of the light emitted from the point light source is refracted toward the top surface of the LGP; and a second inclined surface formed on the side of the LGP facing the point light source in such a way that a portion of the light emitted from the point light source is refracted toward the bottom surface of the LGP.

In this case, the first and second inclined surfaces may be parallel to and face each other and integrated with the LGP.

The illumination apparatus may further include: a hologram pattern that is formed on a bottom surface of the LGP and permits a portion of the incident light refracted by the second inclined surface toward the bottom surface of the LGP to exit from the bottom surface thereof; and a reflector which reflects the portion of the incident light exiting out of the bottom surface of the LGP onto the top surface of the light guide plate.

According to still another aspect of the present invention, there is provided a method for generating an LCD backlight. The method comprises operations of: emitting light onto a side of a light guide place (LGP) comprising a hologram pattern on a top surface thereof, wherein the light is incident obliquely on the hologram pattern at an altitude angle for which diffraction efficiency is highest; exiting a portion of the incident light from the top surface through the hologram pattern.

The method may further comprise operations of: disposing another hologram pattern on the bottom surface of the LGP; reflecting a remaining portion of the incident light from the top surface of the LGP; and exiting a portion of the remaining portion of the light from the bottom surface of the LGP through the other hologram pattern. The method may also include an operation of reflecting the portion of the remaining portion of the light exiting from the bottom surface of the LGP onto the top surface of the LGP.

According to still another aspect of the present invention, the method may further comprise operations of: splitting the light emitted onto the one side of the LGP so that each of the split lights is incident obliquely on the top and bottom surfaces of the LGP, respectively, at an altitude angle for which diffraction efficiency is highest; exiting a portion of each of the split lights from the top and bottom surfaces of the LGP, respectively; and reflecting a remaining portion of each of the split lights from the top and bottom surfaces of the LGP, respectively. The method may also include an operation of reflecting the portion of each of the split lights exiting from the bottom surface of the LGP onto the top surface of the LGP.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE EXEMPLARY EMBODIMENTS

The configurations and operations of illumination apparatuses for a display device according to exemplary embodiments of the present invention will now be described in detail with reference to the accompanying drawings.

Figure 1:
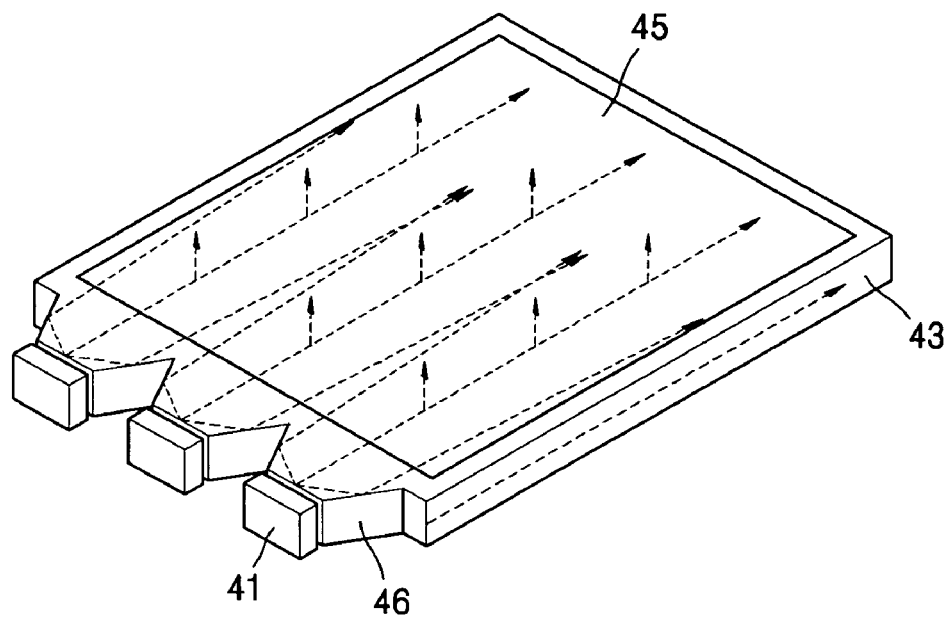
FIG. 1 is a perspective view of an LCD backlight using a conventional hologram-based LGP.
Figure 2:
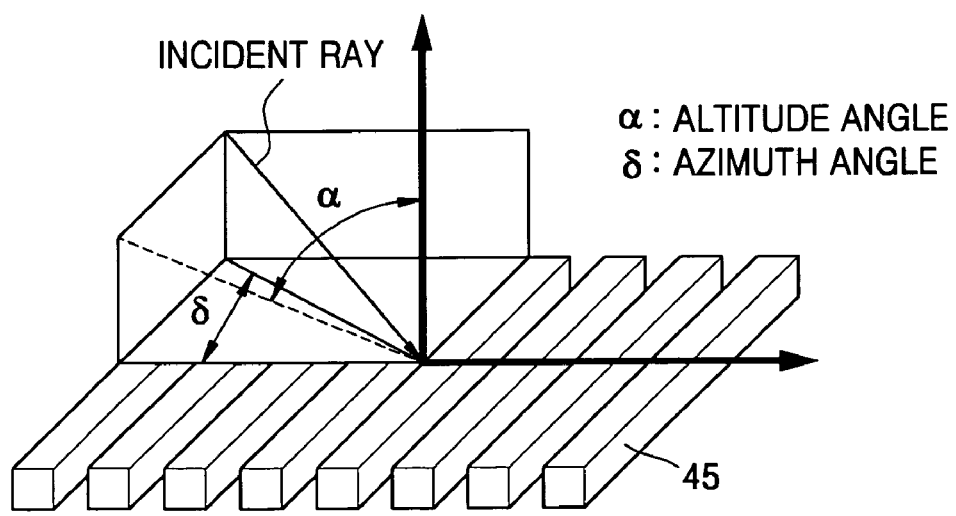
FIG. 2 is a diagram for explaining azimuth angle and altitude angle of a ray incident on a hologram pattern.
Figure 3:
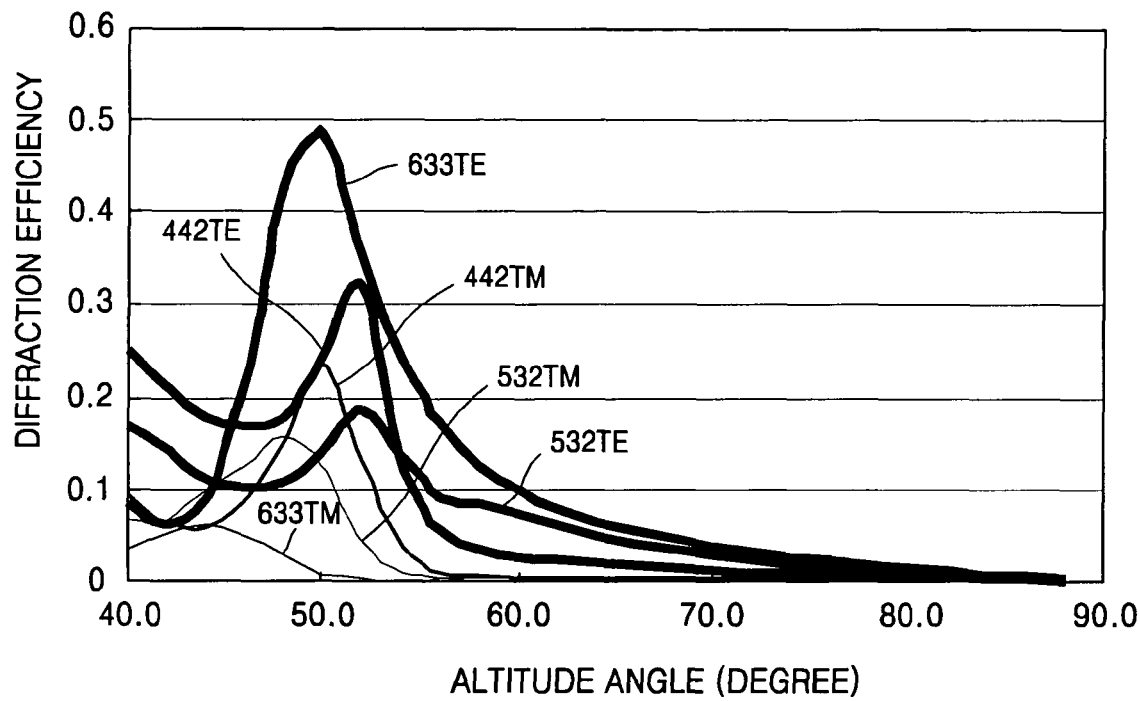
FIG. 3 is a graph of diffraction efficiency vs. altitude angle of an incident ray.
Figure 4:
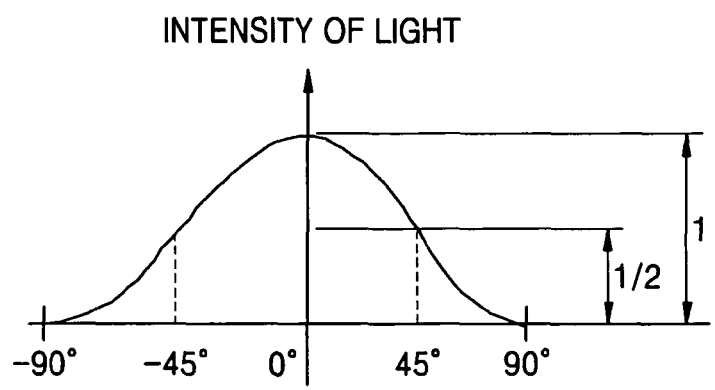
FIG. 4 is a graph of light intensity vs. LED radiation angle.

As described earlier with reference to FIG. 3, when light emitted from a point light source is incident upon a hologram pattern from a specific altitude angle, e.g., about 50°, the incident light can be diffracted with highest efficiency. Thus, the present invention proposes a hologram-based LGP constructed such that light emitted by the point light source can be incident obliquely on the hologram pattern at an altitude angle for which diffraction efficiency is high.

Figure 5A:
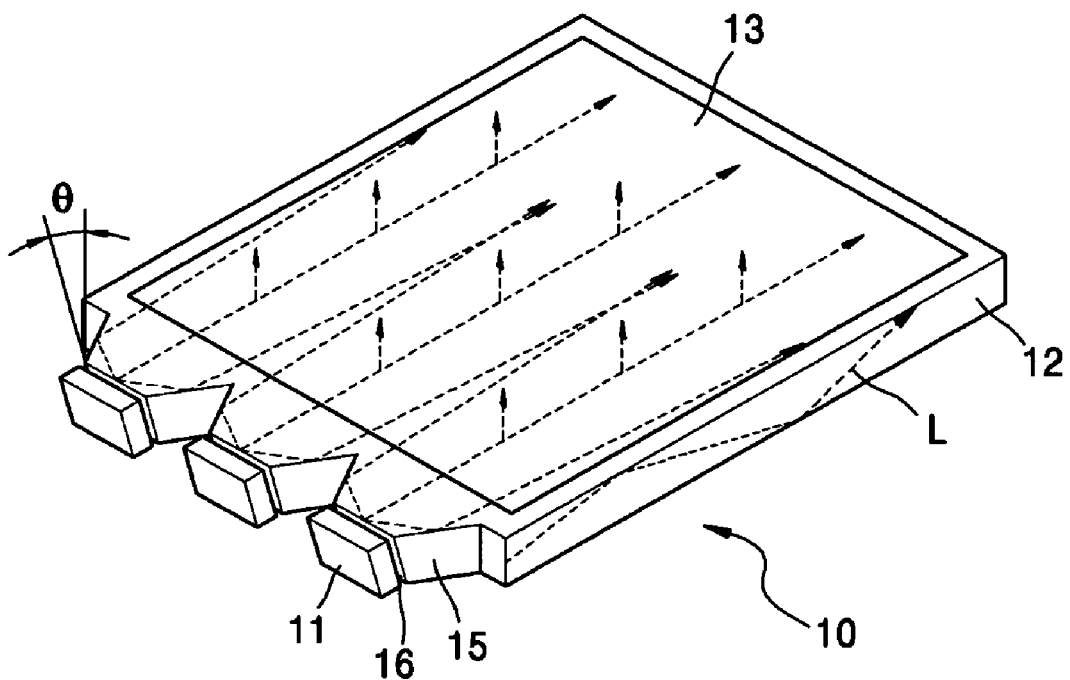
FIGS. 5A and 5B are a perspective view and a cross-sectional view of an illumination apparatus for a display device using a hologram-based LGP according to a first exemplary embodiment of the present invention, respectively.

Referring to FIG. 5A, an illumination apparatus 10 for a display device according to a first exemplary embodiment of the present invention includes a plurality of point light sources 11 and a LGP 12 having a hologram pattern 13 at the top surface thereof. The plurality of point light sources 11 are disposed along one side of the LGP 12. The hologram pattern 13 allows light rays emitted from the point light sources 11 to exit from the top surface of the LGP 12 while providing uniform distributions of brightness and intensity of the exiting rays. The hologram pattern 13 may be a surface- or volume-type hologram pattern. To ensure uniform intensity distribution of light incident on the hologram pattern 13, the hologram pattern 13 may be designed such that the density or diffraction efficiency increases away from the point light source 11. Here, the intensity distribution of light exiting from the LGP 12 can be made uniform by suitably adjusting the size and depth of the hologram pattern 13 and the distance between adjacent hologram patterns 13. The LGP 12 within which incident light propagates can be made of polymethyl methacrylate (PMMA) with excellent light transmittance and weatherability.

The point light sources 11 may be LEDs or laser diodes (LDs). The plurality of point light sources 11 are arranged in close proximity to the LGP 12 at regularly spaced intervals along a line. As shown in FIG. 5A, an incident portion 16 of the LGP 12 is obliquely formed to face the corresponding point light source 11 so that light emitted from the point light source 11 can be incident on the hologram pattern 13 at an altitude angle for which diffraction efficiency is high. That is, the incident portion 16 of the LGP 12 is cut obliquely to face the hologram pattern 13. The point light source 11 may be attached to the slanted surface of the corresponding incident portion 16 or be located at least near and parallel to the incident portion 16. When light is incident on the hologram pattern 13 at an altitude angle of about 50° for which the diffraction efficiency is the highest, the intensity of light exiting from the LGP 12 decreases away from the point light source 11. Thus, to ensure uniform intensity distribution of the exiting light, the incident portion 16 is formed so that the light is incident on the hologram pattern 13 at an altitude angle less than 50°. For example, the incident portion 16 may be slanted at about 10° although the inclination angle may vary with wavelength.

Figure 5B:
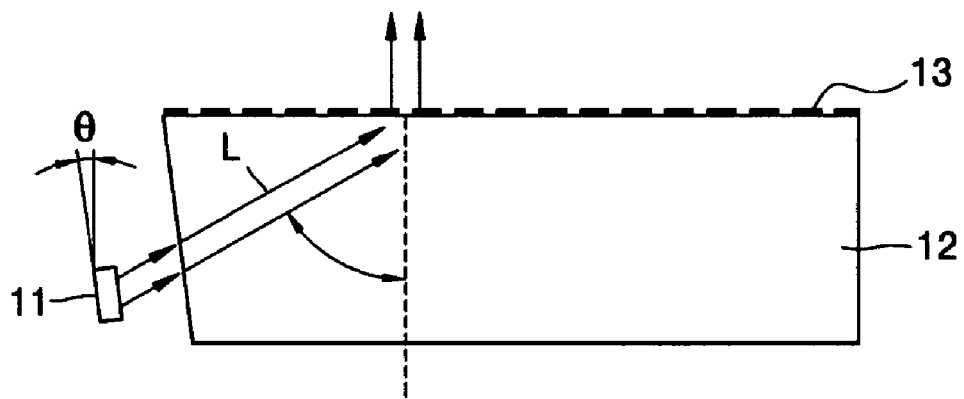

Thus, as shown in FIG. 5B, light L radiated from the point light source 11 impinges vertically onto the incident portion 16, propagates obliquely within the LGP 12, and is incident obliquely on the hologram pattern 13 formed on the top surface of the LGP 12. Then, a portion of the incident light is diffracted by the hologram pattern 13 and exits out of the top surface of the LGP 12. In this case, as described above, since the hologram pattern 13 has the highest diffraction efficiency, the portion of light can exit from the top surface of the LGP 12 with little loss. On the other hand, the remaining portion of the incident light is totally reflected from the top surface of the LGP 12 onto the bottom surface of the LGP 12 and is again totally reflected from the bottom surface of the LGP 12 onto the top surface. Since the light is incident obliquely on the hologram pattern 13, the portion of the light is diffracted by the hologram pattern 13 with highest efficiency and exits out of the top surface of the LGP 12. As described above, to achieve the uniform intensity distribution of light, the density of the hologram pattern 13 may be adjusted depending on the distance from the point light source 11.

Referring to FIG. 5A, the illumination apparatus 10 further includes a collimator 15 collimating a beam emitted from the point light source 11 into a substantially parallel beam so that the beam can be incident on the hologram pattern at azimuth angle θ for which the diffraction efficiency is highest. The collimator 15 has oblique surfaces formed on either side of the incident portion 16 and reflects the beam emitted by the point light source 11 in a direction near parallel to an optical axis. The collimator may also be a cylindrical lens formed near the incident portion 16 as known in the art.

Figure 6:
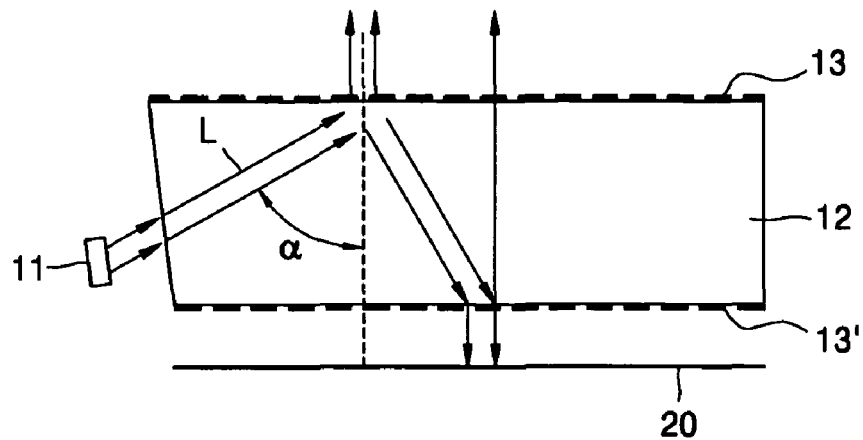
FIG. 6 is a cross-sectional view showing a modified example of the illumination apparatus of FIG. 5A according to an exemplary embodiment of the present invention.

FIG. 6 is a cross-sectional view showing a modified example of the illumination apparatus 10. Referring to FIG. 6, the LGP 12 further has a hologram pattern 13' on the bottom surface thereof, and a reflecting mirror 20 is disposed below the hologram pattern 13'. Light L radiated from the point light source 11 is incident obliquely on the top surface of the LGP 12 at a predetermined altitude angle α. Then, a portion of the incident light is diffracted by the hologram pattern 13 and exits out of the top surface of the LGP 12 while the remaining portion is totally reflected from the top surface of the LGP 12 onto the bottom surface thereof. A portion of the light incident on the bottom surface of the LGP 12 is diffracted by the hologram pattern 13', exits out of the bottom surface of the LGP 12, and is reflected by the reflecting mirror 20 onto the top surface of the LGP 12. The remaining portion is again totally reflected from the bottom surface of the LGP 12 onto the top surface thereof.

In the exemplary embodiment described with reference to FIGS. 5A-6, the point light source 11 is disposed on the inclined incident portion 16 of the LGP 12. Alternatively, light emitted from the point light source 11 may be refracted by a refracting element and incident obliquely to the LGP 12.

Figure 7:
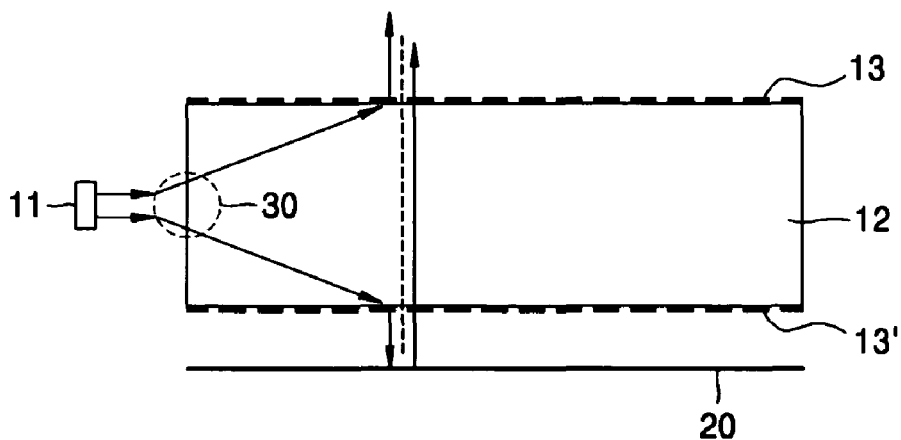
FIG. 7 is a cross-sectional view of an illumination apparatus for a display device using a hologram-based LGP according to a second exemplary embodiment of the present invention.

FIG. 7 is a cross-sectional view of an illumination apparatus for a display device using a refracting element according to a second exemplary embodiment of the present invention. Referring to FIG. 7, a point light source 11 is disposed near one side of a LGP 12. A refracting lens 30 is disposed on an incident portion of the LGP 12 facing the point light source 1. Light rays emitted from the point light source 11 are incident vertically on the incident portion of the LGP 12. The direction of the light rays is changed by the refracting lens 30 so that they are incident obliquely on the top and bottom surfaces of the LGP 12, respectively. Thus, the refracting lens 30 is a diverging lens and has a different refractive index than the LGP 12. Preferably, but not necessarily, the refracting lens 30 may have a higher refractive index than the LGP 12.

The split rays incident on the top and bottom surfaces of the LGP 12 are respectively diffracted by hologram patterns 13 and 13' formed on the top and bottom surfaces of the LGP 12. The ray diffracted by the hologram pattern 13 exits from the top surface of the LGP 12 while the other ray diffracted by the hologram pattern 13' exits from the bottom surface of the LGP 12, is reflected by a reflecting mirror 20 disposed below the hologram pattern 13', and finally exits from the top surface of the LGP 12. On the other hand, portions of the incident rays are totally reflected within the LGP 12 onto the top and bottom surfaces of the LGP 12. The hologram pattern 13' and the reflecting mirror 20 are optional elements. Although not shown in FIG. 7, a collimator may also be disposed on the incident portion of the LGP 12 and adjust the azimuth angle of incident light ray.

Figure 8:
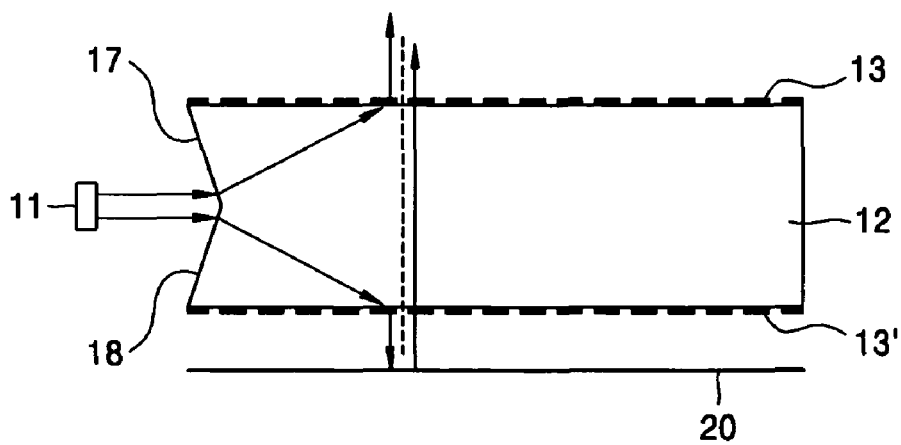
FIG. 8 is a cross-sectional view of an illumination apparatus for a display device using a hologram-based LGP according to a third exemplary embodiment of the present invention.

FIG. 8 is a cross-sectional view of an illumination apparatus for a display device using a hologram-based LGP according to a third exemplary embodiment of the present invention. Like in the second exemplary embodiment as shown in FIG. 7, since a point light source 11 is disposed straightly near one side of the LGP 12, light rays emitted from the point light source 11 are all parallel and travel toward the LGP 12. Referring to FIG. 8, two inclined surfaces 17 and 18 are disposed horizontally parallel to each other on an incident portion of the LGP 12 facing the point light source 11 so that a light ray from the point light source 11 is incident on the LGP 12 at a predetermined altitude angle.

The first inclined surface 17 is formed on an upper incident portion such a way as to refract a portion of light emitted from the point light source 11 toward the top surface of the LGP 12. That is, the upper half of the incident portion of the LGP 12 is cut inwardly from the top of the incident portion to the center. The second inclined surface 18 is formed on a lower incident portion in such a way that a portion of light emitted from the point light source 11 can be refracted toward the bottom surface of the LGP 12. That is, the lower half of the incident portion of the LGP 12 is cut inwardly from the bottom of the incident portion to the center. Thus, the entire incident portion of the LGP 12 is concavely shaped. The first and second inclined surfaces 17 and 18 face each other and are symmetric about the horizontal center of the incident portion. The two inclined surfaces 17 and 18 may be integrated with the LGP 12 using the same material as the LGP 12. Alternatively, they may be fabricated separately in the shape of a prism and attached to the incident portion of the LGP 12.

The light rays are incident on the top and bottom surfaces of the LGP 12, respectively, as they pass through the first and second inclined surfaces 17 and 18 and are diffracted by the hologram patterns 13 and 13' formed on the top and bottom surfaces of the LGP 12. The light rays subsequently propagate along the same path as shown in FIG. 7.

Although not shown in FIG. 8, a collimator may also be disposed on the incident portion of the LGP 12 and adjust the azimuth angle of incident light ray.

An illumination apparatus for a display device using a hologram-base LGP allows light to be incident on a hologram pattern formed on the LGP at an altitude angle for which the diffraction efficiency of the hologram pattern is highest, thereby increasing the ratio of light exiting from the LGP to light incident thereon. Thus, when the illumination apparatus of the present invention is used as a backlight of an LCD, the illumination apparatus provides improved brightness compared to conventional products.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illumination apparatus for a display device, comprising:
   at least one point light source that emits light;
   a light guide place (LGP) comprising a first surface on which a hologram pattern is formed, a second surface which faces the first surface, and a third surface which faces the at least one point light source; and
   a diverging refractive lens which is formed on the third surface and divergently refracts the light emitted from the at least one point light source so that the light divergently refracted by the diverging refractive lens is incident obliquely on the first and second surfaces,
   wherein the diverging refractive lens has a refractive index different from a refractive index of the LGP.

2. The apparatus of claim 1, wherein the refractive index of the diverging refractive lens is greater than the refractive index of the LGP.

3. The apparatus of claim 1, further comprising a second hologram pattern which is formed on the second surface.

4. The apparatus of claim 3, further comprising:
   a reflector which is disposed to face the second surface and reflects light exiting out through the second surface onto the first surface.

* * * * *